June 30, 1925.  
E. J. HALE  
BROOM CORN TABLER  
Filed July 8, 1924  
1,544,450  
6 Sheets-Sheet 1
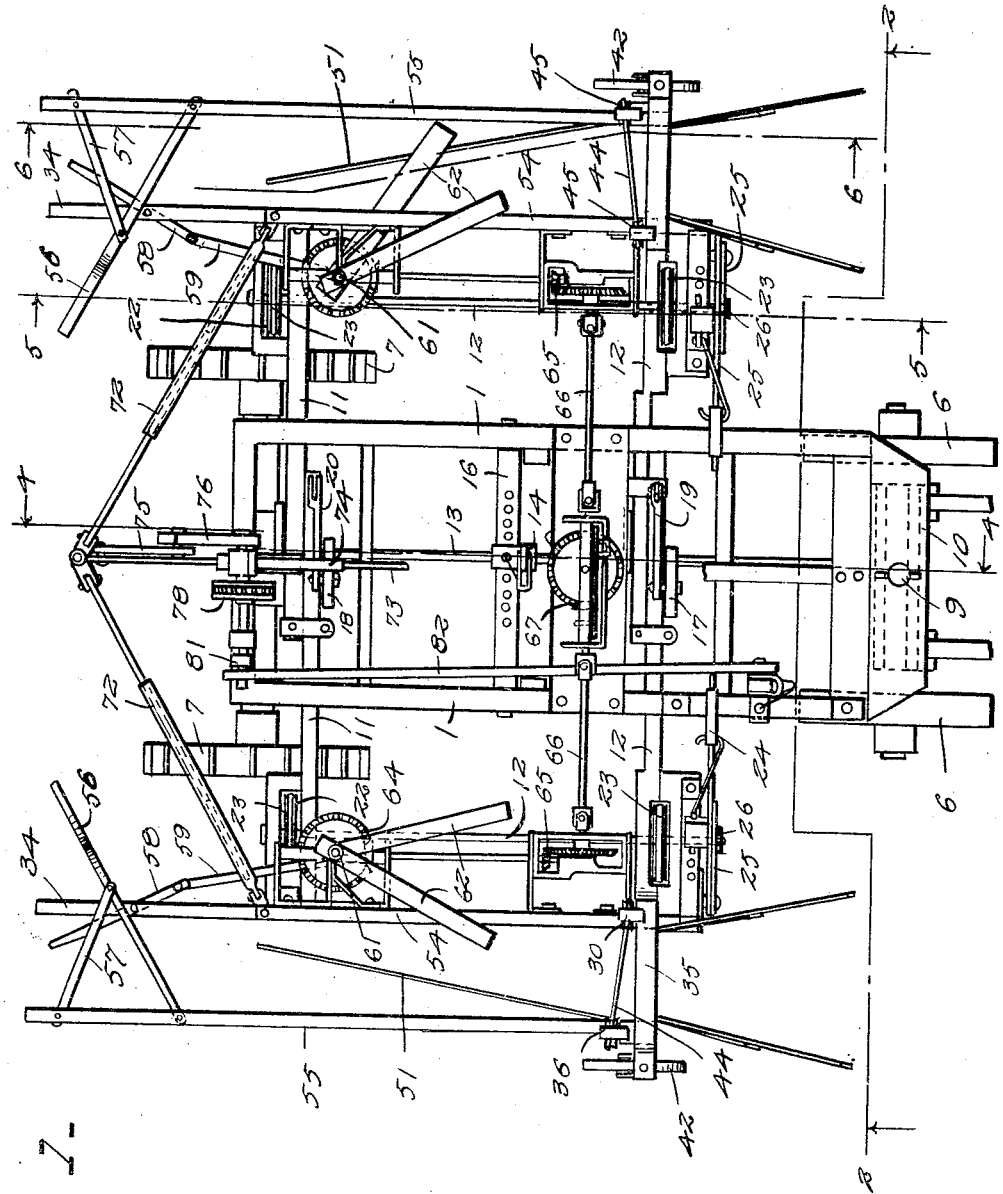
FIG. 1
Inventor  
E. J. Hale  
By  
Attorney

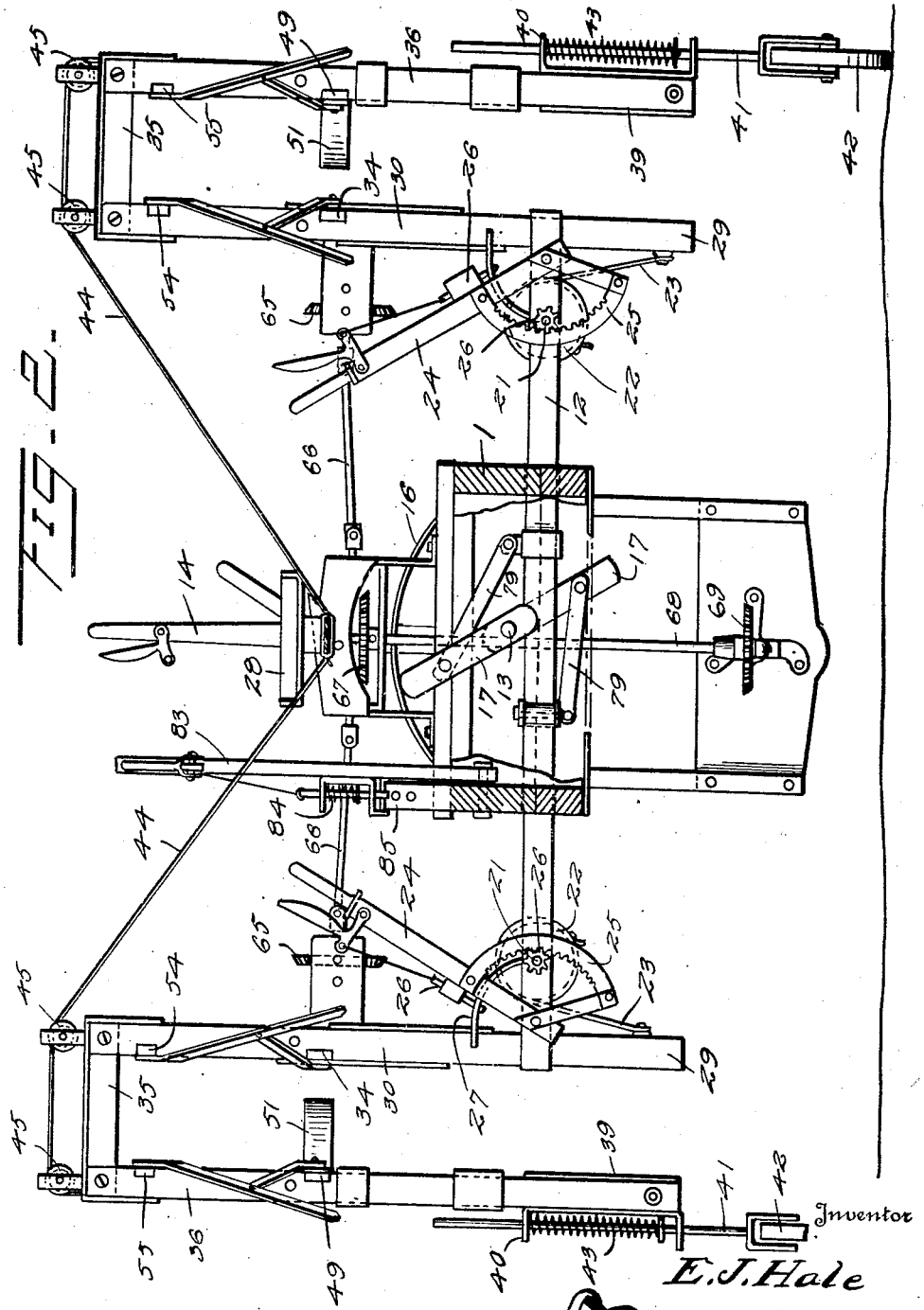

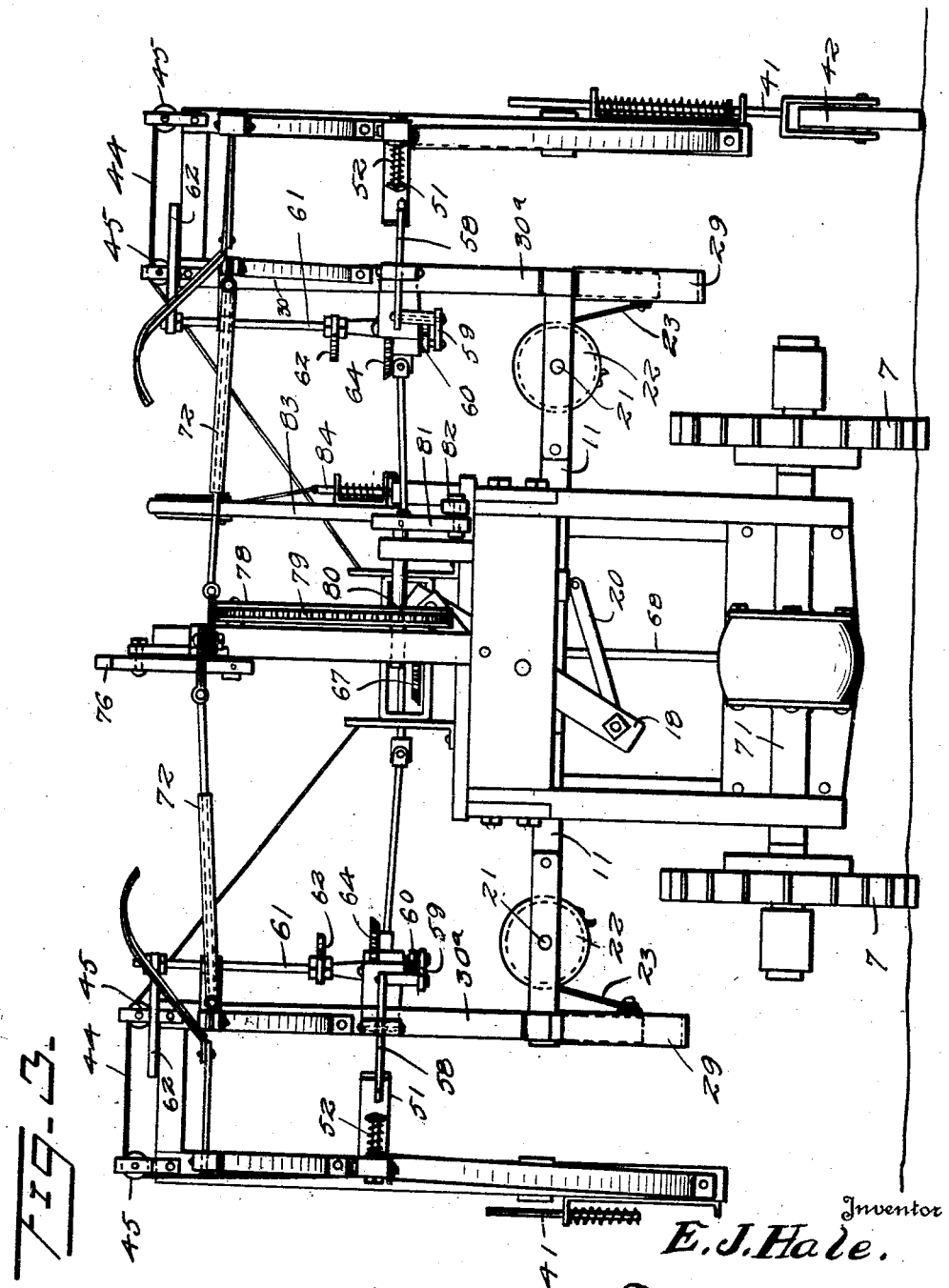

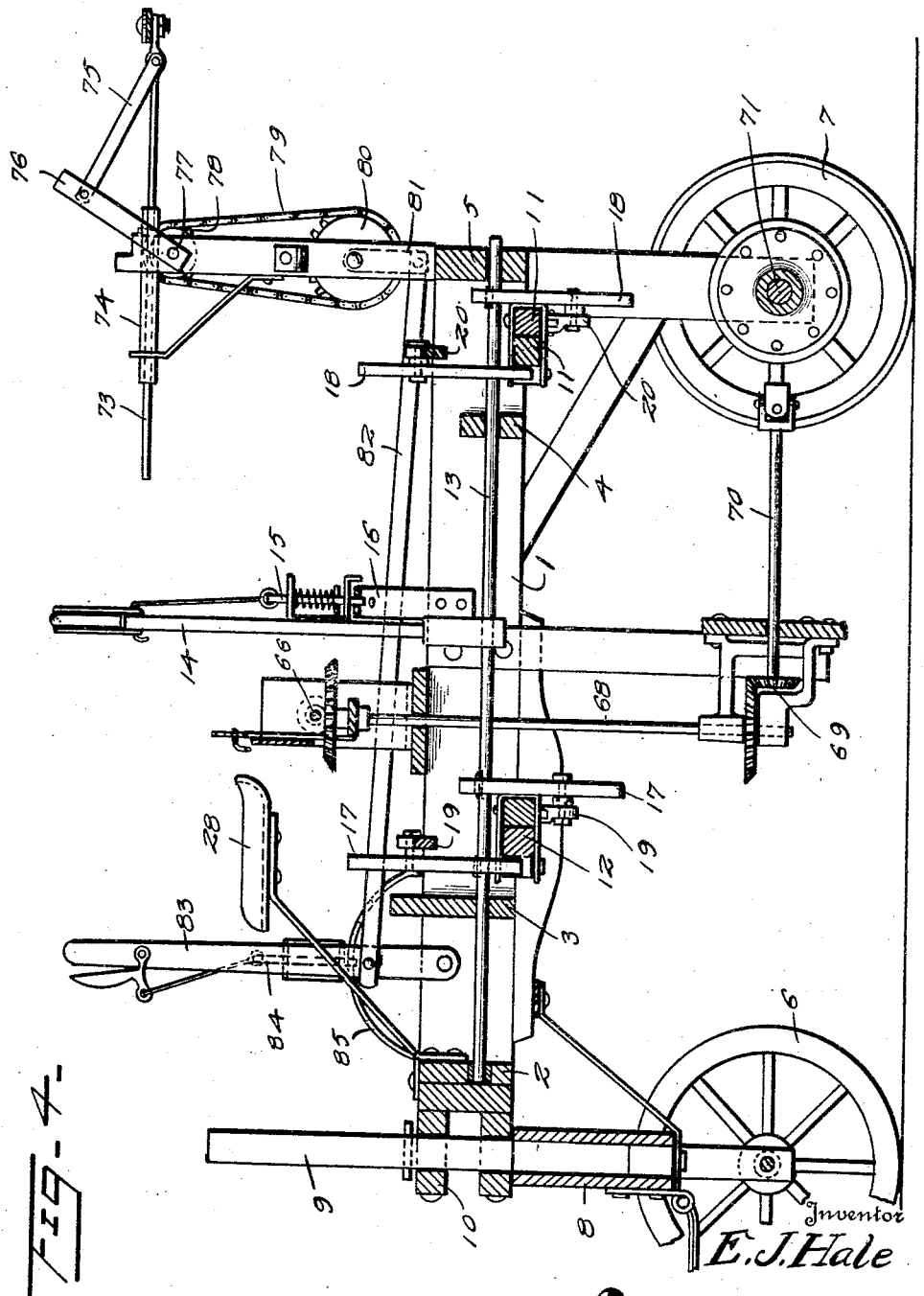

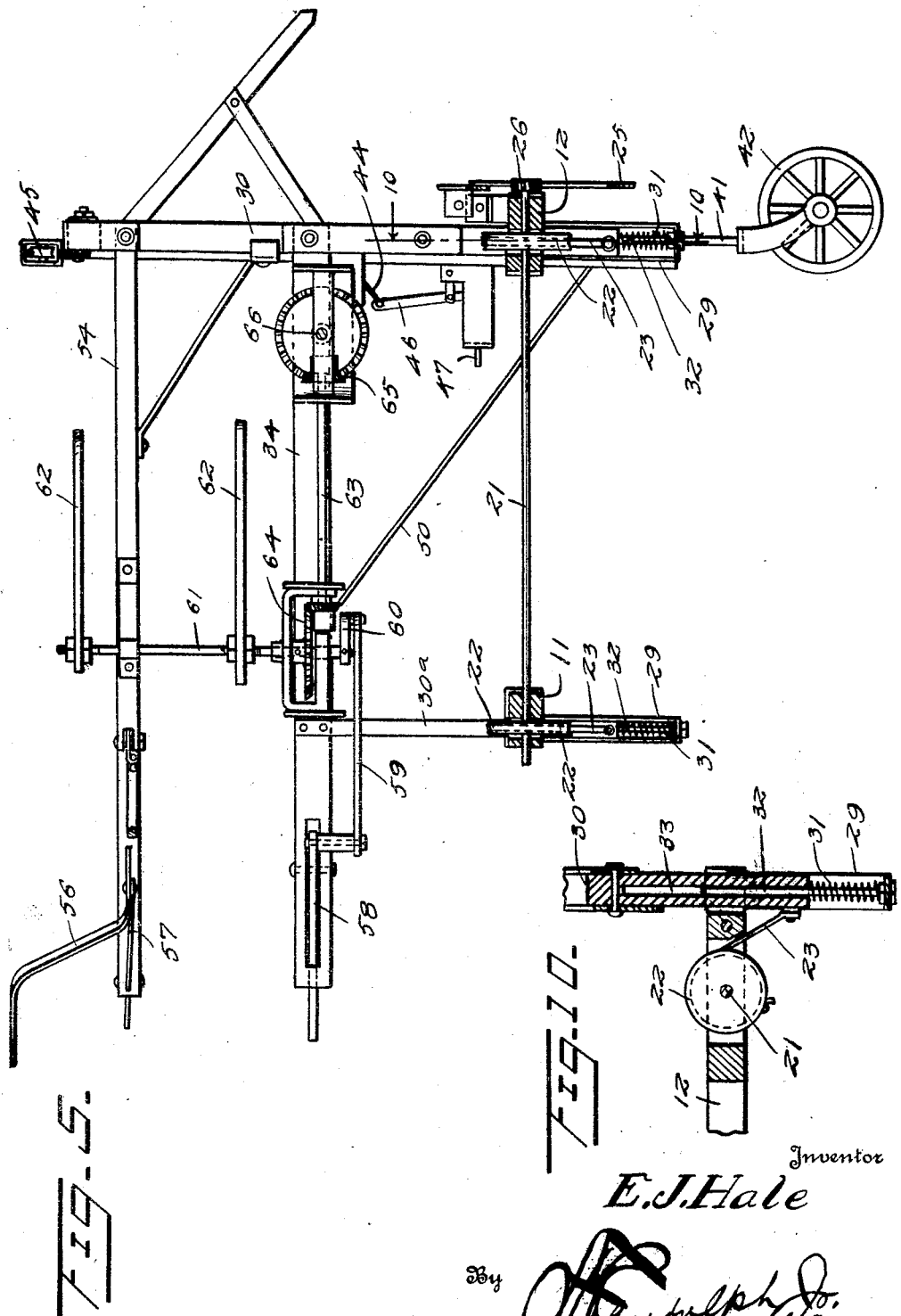

June 30, 1925. 1,544,450
E. J. HALE
BROOM CORN TABLER
Filed July 8, 1924 6 Sheets-Sheet 6
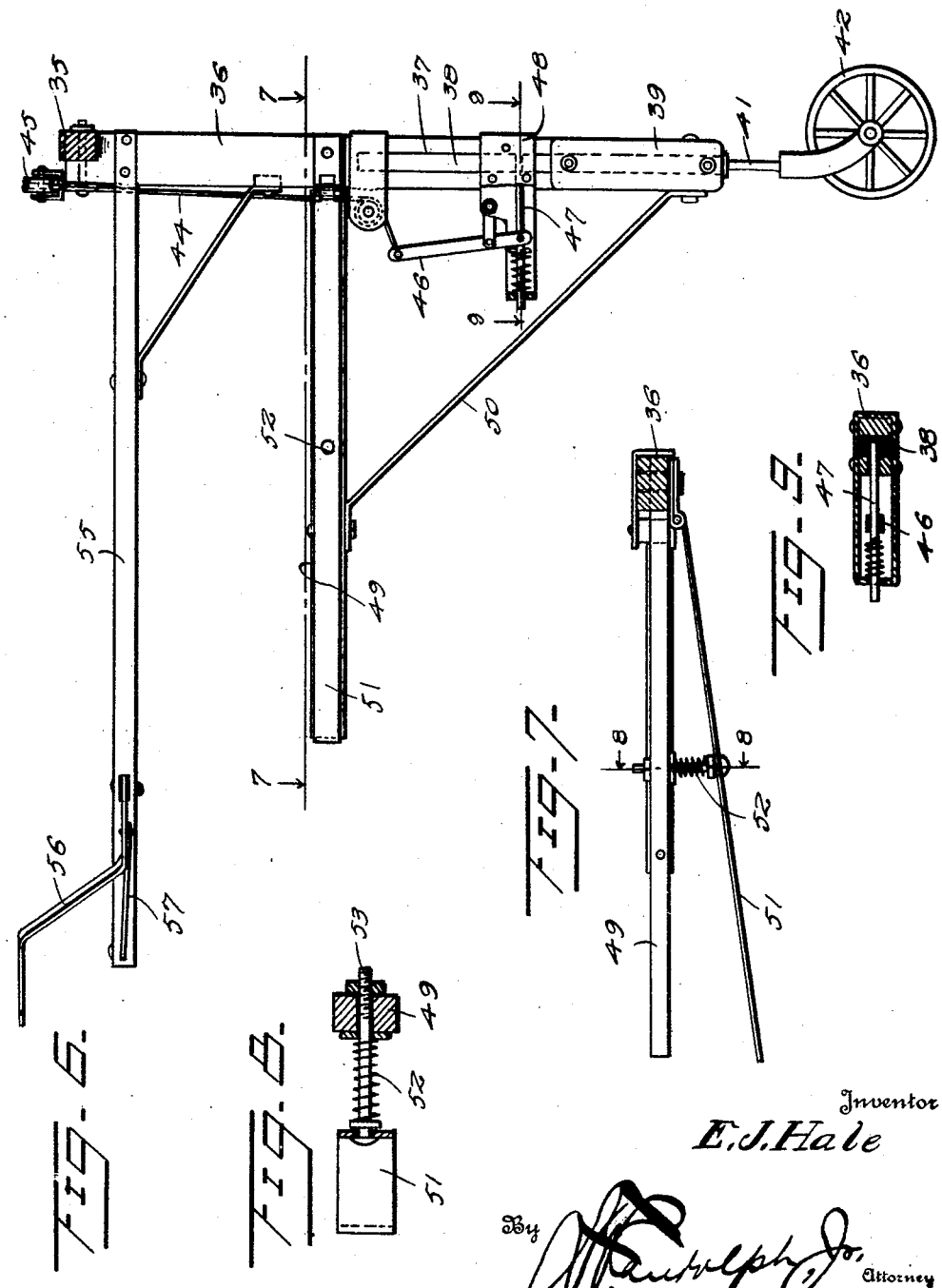

Patented June 30, 1925.

1,544,450

UNITED STATES PATENT OFFICE.

EDWARD J. HALE, OF MINCO, OKLAHOMA.

BROOM-CORN TABLER.

Application filed July 8, 1924. Serial No. 724,844.

*To all whom it may concern:*

Be it known that I, EDWARD J. HALE, a citizen of the United States, residing at Minco, in the county of Grady and State of Oklahoma, have invented certain new and useful Improvements in Broom-Corn Tablers; and I do hereby declare the following to be a full, clear, and exact description of the invention, such as will enable others skilled in the art to which it appertains to make and use the same.

The present invention relates to agricultural implements and more particularly to harvesting machines and has for its object the provision of a broom corn harvester which is readily adjustable whereby it may be adapted to grain of varying height and different distances between the rows, the parts being of such construction and relation as to admit of the various adjustments being effected without requiring the driver to dismount or without bringing the machine to a standstill, the machine being designed to operate on two rows of broom corn at the same time.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a two row broom corn tabler embodying the invention;

Figure 2 is an enlarged sectional view on the line 2—2 of Figure 1 looking in the directon of the arrows;

Figure 3 is a rear view of the machine;

Figure 4 is a vertical longitudinal section on the line 4—4 of Figure 1, showing the parts on a larger scale;

Figure 5 is a vertical longitudinal section on the line 5—5 of Figure 1;

Figure 6 is a detail sectional view on the line 6—6 of Figure 1;

Figure 7 is a detail sectional view on the line 7—7 of Figure 6;

Figure 8 is a sectional view on the line 8—8 of Figure 7;

Figure 9 is a detail sectional view on the line 9—9 of Figure 6;

Figure 10 is a detail sectional view on the line 10—10 of Figure 5.

Corresponding and like parts are referred to in the following description and designated in the several views of the drawings by like reference characters.

The main frame which may be of any preferred construction best adapted for receiving and supporting the operating parts is shown as comprising longitudinal members 1 and cross members 2, 3, 4 and 5 connecting the longitudinal members to provide a substantial structure. Front wheels 6 and rear wheels 7 support the main frame. The front wheels 6 are mounted on a frame 8 which is provided with a vertical stem 9 which is pivotally mounted in a cross piece 10 located at the front of the main frame and connected to the cross member 2. In this manner the front wheels 6 are adapted to turn to admit of the machine being properly steered and the frame 8 is of such construction as to admit of the wheels 6 readily conforming to the surface of the ground without producing any strain or binding action.

Similar bars 11 and 12 project laterally from opposite sides of the main frame and are laterally adjustable and the inner ends of the respective bars overlap as shown most clearly in Figure 1 said bars being mounted in guides attached to the longitudinal members 1. A centrally disposed longitudinal shaft 13 is mounted in the cross members of the frame, and an operating lever 14 is fast thereto and is provided with a latch 15 which co-acts with a curved bar 16 whereby to hold the shaft 13 in the required adjusted position. Pairs of arms 17 and 18 project from the shaft 13 and are fast thereto the arms of each pair being oppositely disposed. Links 19 connect the respective arms 17 to the bars 12 and links 20 connect the arms 18 to the bars 11. As a result of this arrangement, rotation of the shaft 13 moves the bars 11 and 12 in opposite directions said bars being held in the required adjusted position by the latch 15 entering one of a plurality of openings formed in the curved bar 16. The pairs of bars 11 and 12 receive a simultaneous and like movement when operating the lever 14.

A shaft 21 is provided at each side of the machine and is mounted in the outer ends of the bars 11 and 12 and each of these shafts has a grooved pulley 22 fast to each end thereof and a flexible connection 23 attached at one end to each of the pulleys 22 has its opposite end secured to a member at the outer end of the respective bars 11 and 12 whereby to effect simultaneous vertical adjustment of said members. A lever 24 is provided for each of the shafts 21 and a toothed bar 25 movable therewith co-acts with a pinion 26 fast to the shaft 21 whereby said shaft is rotated to effect vertical adjustment of the members at the outer ends of the laterally adjustable bars 11 and 12. A latch 26 carried by the lever 24 co-operates with a curved bar 27 to secure the parts in the required adjusted positions. The upper ends of the levers 24 are disposed within convenient reach of the driver's seat 28 and this is true of the lever 14.

A guide 29 is attached to the outer end of each of the bars 11 and 12 and depends therefrom. A member 30 is mounted in each of the guides 29 at the outer ends of the bars 12 and a similar member 30ª is mounted in each of the guides 29 at the outer ends of the bars 11. A helical spring 31 yieldably supports each of the members 30 and 30ª and is mounted upon a rod 32 attached to the lower end of the guide 29 and entering an opening 33 in the lower end of the respective members 30 and 30ª. The springs 31 are under tension and sustain the major part of the weight of the members 30 and 30ª and the parts carried thereby. A breaker bar 34 is disposed at each side of the machine and is attached to the members 30 and 30ª. The upper end of the member 30ª terminates in the plane of the breaker bar 34 whereas the member 30 projects upwardly some considerable distance and is connected to one end of a cross-piece 35, the outer end of said cross-piece being connected to a vertical member 36 spaced from the member 30 and forming therewith and with the cross-piece 35 an arch which straddles a row of broom corn as the machine is advanced over the field. The lower portion of the member 36 is slotted as indicated at 37 and receives a standard 38. Plates 39 attached to opposite sides of the standard 38 engage the member 36 upon opposite sides of the slots 37, the outer plates having off-standing ears 40 in which is mounted the stem 41 of a frame in which is mounted a caster wheel 42. A helical spring 43 yieldably supports the caster wheel and the outer portion of the arch. A flexible connection 44 passes over guide pulleys 45 at the top of the arch and is connected to a latch lever 46 which coacts with a latch 47 whereby to secure the standard 38 in the required adjusted position.

The flexible connections 44 extend within convenient reach of the driver's seat 28. The lever 46 and latch mechanism 47 are mounted in a frame 48 attached to the member 36. A bar 49 opposite the breaker bar 34 is attached at its front end to the member 36 and is strengthened by means of a brace 50 which is interposed between the parts 36 and 49. The bar 49 operates as a guide to support and direct the heads of the broom corn to the breaker bar. A pressure member 51 is connected at its front end to the member 36 and is disposed in the plane of the bars 49 and 34 and serves to hold the broom corn laterally across the breaker bar 34. The pressure member 51 may consist of a spring bar which is supplemented by means of a spring 52 mounted upon a guide pin 53 attached to the bar 29 and passing loosely through the bar 49. Upper bars 54 and 55 are attached to the respective members 30 and 36 and extend rearwardly in spaced relation. A guide 56 is attached to the rear end of the bar 55 and inclines inwardly and rearwardly to give proper direction to the heads of the broom corn after being broken over the bar 34. A brace 57 fulcrums the guide 56.

A retarder 58 is pivoted to the rear end of the breaker bar 34 and operates across the space formed between the bars 54 and 49 and serves to hold the heads of the broom corn until operated upon by the breaker mechanisms. The retarder 58 is connected by means of a link 59 to a crank 60 at the lower end of a vertical shaft 61 which is mounted in bearings applied to the bars 54 and 34. Beaters 62 are attached to the shaft 61 and are disposed to co-act with the bars 54 and 55. A longitudinal shaft 63 is geared at its rear end to the vertical shaft 61 as designated at 64 and is geared at its front end as indicated at 65 to a transversely disposed shaft 66 which in turn is geared at its inner end as indicated at 67 to a vertical shaft 68 which is geared at its lower end as indicated at 69 to a drive shaft 70 geared to the rear axle 71 in any preferred way. In this manner motion is transmitted from the rear drive wheels 7 to the vertical shaft 61 of the broom corn tabling or breaker mechanism.

Regulators 72 comprising telescoping members are interposed between the rear ends of the bars 54 and a rod 53 which is slidably mounted in a longitudinal guide 54. A link 75 connects the inner ends of the regulators 72 with an arm 76 which is fast to one end of a shaft 77 the opposite end of said shaft being provided with a sprocket wheel 78 which is connected by means of a sprocket chain 79 with a sprocket wheel 80 fast to a shaft to which is attached an arm 81. A rod connects the arm 81 with an operating lever 83, located convenient to the driver's seat 28 and provided with a latch 84 which co-acts with a curved bar 85, whereby to hold the parts in the required adjusted position. It is observed that the several adjustments may be readily effected without necessitating the driver to leave the seat 28 or to stop the machine for the purpose of making adjustments. It is further observed that the breaking mechanisms may be adjusted vertically and laterally according to the height of the grain and the distance apart of the rows of broom corn.

What is claimed is:—

1. A broom corn tabler comprising a main frame, broom corn breaking mechanisms at each side of the main frame, and means to adjust said frame both laterally and vertically to adapt the machine to varying distances between the rows and to varying heights of the grain.

2. A broom corn tabler comprising a main frame, arches at the sides of the main frame, means for adjusting the arches laterally, other means for adjusting the arches vertically, and broom corn breaker mechanisms mounted upon each of the arches.

3. A broom corn tabling machine comprising a main frame, a broom corn breaking mechanism, a supporting frame therefor, and means for adjusting said supporting frame vertically, the same comprising a shaft, pulleys fast to the shaft, a flexible connection between each of the pulleys and the said supporting frame, and means for rotating the shaft to adjust the said supporting frame vertically and hold the same in the required adjusted position.

4. In a broom corn tabling machine, a main frame, lateral supports, vertically disposed guides carried by the lateral supports, vertical members loosely mounted in said guides, yieldable supports between said vertical members and the guides, means for adjusting the vertical members, and broom corn breaker mechanisms mounted upon said vertical members.

5. In a broom corn tabling machine, a main frame, lateral supports, vertical members mounted in said lateral supports, means to vertically adjust said vertical members, yieldable supporting means for said members, a second vertical member connected at its upper end to the first mentioned vertical member to hold therewith a caster wheel at the lower end of said second vertical member, yieldable and adjustable means for said caster wheel, and broom corn breaker mechanisms carried by the said vertical members.

6. A broom corn tabling machine comprising a main frame, a vertically disposed arch at the side of the main frame, means for adjusting the arch vertically, a standard on the outer member of the arch, means to vertically adjust said standard, a yieldably mounted caster wheel connected to the said standard, a latch mechanism for securing said standard in the required adjusted position, and operating means for the latch mechanism extending within convenient reach of the driver's seat.

7. In a broom corn tabling machine, a breaker bar, a supporting frame therefor, a co-acting bar carried by said supporting frame, and a laterally yieldable pressure member carried by said co-acting bar and adapted to urge the broom corn laterally toward said breaker bar.

8. In a broom corn tabling machine, a breaker bar, a supporting frame therefor, a co-acting bar carried by said supporting frame, a laterally yieldable pressure member carried by said co-acting bar and adapted to urge the broom corn laterally toward said breaker bar, a retarder in the rear of the pressure member and pivoted to the breaker bar, and means for imparting oscillatory movement to the said retarder.

9. In a broom corn tabling machine, a main frame, pairs of laterally adjustable bars, supporting frames at the outer ends of the said bars and provided with broom corn breaker mechanisms, a longitudinally disposed shaft, oppositely disposed arms fast to said shaft, and links connecting said arms with the laterally disposed bars whereby to effect adjustment thereof.

10. A broom corn tabling machine comprising a main frame, arches at the sides of the main frame, means to adjust said arches laterally and vertically, broom corn breaker mechanisms carried by the arches, a drive shaft on the main frame and connecting means between said drive shaft and the breaker mechanisms comprising telescoping shafts provided with universal joints.

11. A broom corn tabling machine comprising a main frame, arches at the sides of the main frame, means to adjust said arches laterally and vertically, broom corn breaker mechanisms carried by the arches, a drive shaft on the main frame, connecting means between said drive shaft and the breaker mechanisms comprising telescoping shafts provided with universal joints, regulators between the breaker mechanisms and a longitudinally movable shaft, said regulators comprising telescoping members, an operating lever, and connecting means between said operating lever and the longitudinally movable shaft associated with the said regulators.

12. A broom corn tabling machine comprising a main frame, pairs of laterally adjustable bars, arches at the outer ends of the said bars, means mounted upon the bars for adjusting the arches vertically, a broom corn breaker mechanism carried by each of the arches, pressure members for urging the broom corn toward the breaker bars of the breaker mechanisms, retarders for holding the broom corn, a drive shaft on the main frame, and adjustable connections between the drive shaft and the breaker mechanisms.

In testimony whereof I affix my signature in presence of two witnesses.

EDWARD J. HALE.

Witnesses:
VIOLA M. SCHUTTEN,
THOMAS B. ARTHUR.